(12) United States Patent
Dragoljevic et al.

(10) Patent No.: US 10,423,527 B2
(45) Date of Patent: Sep. 24, 2019

(54) MEMORY MANAGEMENT AND IMAGE DISPLAY FOR MOBILE DEVICES

(71) Applicant: Facebook, Inc., Menlo Park, CA (US)

(72) Inventors: Ognjen Dragoljevic, London (GB); Tyrone Nicholas, Croydon (GB)

(73) Assignee: Facebook, Inc., Menlo Park, CA (US)

( * ) Notice: Subject to any disclaimer, the term of this patent is extended or adjusted under 35 U.S.C. 154(b) by 429 days.

(21) Appl. No.: 14/939,001

(22) Filed: Nov. 12, 2015

(65) Prior Publication Data

US 2017/0139824 A1 May 18, 2017

(51) Int. Cl.
*G06F 12/02* (2006.01)

(52) U.S. Cl.
CPC .. *G06F 12/0261* (2013.01); *G06F 2212/1041* (2013.01)

(58) Field of Classification Search
CPC .............. G06F 12/0253; G06F 2212/69
See application file for complete search history.

(56) References Cited

U.S. PATENT DOCUMENTS 6,763,440 B1 * 7/2004 Traversat ............ G06F 12/0276
707/999.202

* cited by examiner

*Primary Examiner* — Michael Alsip
(74) *Attorney, Agent, or Firm* — FisherBroyles, LLP (57) ABSTRACT

An object manager can manage memory in a mobile device to provide more effective use of resources and a better user experience. The object manager can store objects in different types of memory (e.g., ashmem or native memory) instead of the JAVA heap. When storing data objects in different types of memory, the system can use reference counting to manage objects. The object manager can also coordinate retrieval and display of images to further improve a user experience by progressively displaying images or asynchronously retrieving images from a network. The object manager can, for example, display a low resolution image first while a second higher resolution image is retrieved from a network and that image is progressively displayed. Also, the object manager can retrieve objects from local memory, a cache, or the network sequentially or in parallel.

20 Claims, 9 Drawing Sheets

MEMORY MANAGEMENT AND IMAGE DISPLAY FOR MOBILE DEVICES

BACKGROUND

Features and capabilities associated with displaying images on a mobile device is evolving. For example, mobile device users download and an increasingly large number of mobile applications ("apps"), and many of these applications can display images. For example, mobile device users can have a weather mobile application to view a graphical forecast, a shopping mobile application to shop for clothes, and a social media mobile application to view or share images with friends and family. Furthermore, mobile device users desire to browse through images on mobile applications quickly and reliably.

Mobile devices (e.g., smartphones) that execute these applications have limited processing power, limited memory, and limited access to network bandwidth. Despite increase in technological sophistication of mobile devices, some mobile applications provide poor image handling capabilities, resulting in a less than satisfactory experience for users. Take, for instance, a user viewing multiple high definition photos in a mobile application. The user can be unsatisfied with the time it takes to load the photos, or the inability to quickly navigate between a current photo and another photo.

Also, mobile device users can experience memory shortages when attempting to view several photos in a mobile application in a short amount of time or switching between different mobile applications that use images. Users must often wait for a mobile application to reacquire a previously viewed image when they are viewing it a second time, even when they have not navigated away from a current page or social media feed that includes images. Additionally, mobile applications or mobile software can crash when executing some memory routines because a mobile device user is overloading the system with requests to view or store images.

Several hardware and software approaches have been used in an attempt to solve the problems described above. Examples include designing mobile devices with
   more memory and requiring customers to pay for frequent software updates. These approaches, however, are prone to high cost, underutilization of existing hardware and software, and user dissatisfaction due to the constant requirement to purchase new or updated software. Also, new or updated software both can be costly or can cause users to experience errors with a new system.

BRIEF DESCRIPTION OF THE DRAWINGS

The techniques introduced in this disclosure can be better understood by referring to the following Detailed Description in conjunction with the accompanying drawings in which like reference numerals indicate identical or functionally similar elements.

DETAILED DESCRIPTION

An object manager can obtain objects, display viewable portions of objects, and manage memory for objects on a mobile device. For example, a mobile device user can request to view an image using a mobile application. In response to this request, the object manager can communicate with the mobile application to first display a low resolution image that is locally stored and made available in mobile device memory and the object manager can contemporaneously request a high resolution version of the image from a network resource. The object manager can update portions of the low resolution image while the object manager receives portions of the high resolution version from the network.

The object manager can also manage memory that stores the objects. For example, instead of storing an image in heap memory, the object manager can store the image in different types of memory, e.g., native memory or alternative memory. Heap memory can be an area of memory used for dynamic allocations, which can be blocks of memory that are allocated and freed in an arbitrary order and accessed multiple times. JAVA Heap memory is memory which is allocated to applications running under a JAVA virtual machine. Contrasted with heap memory, native memory can be non-heap memory that is generally larger than heap memory. In addition, alternative memory can be operating system shared memory such as ANDROID shared memory ("ashmem").

To manage storing objects in these types of memory, the object manager can create a reference in heap memory for the image, and the reference can point to the image location in the different types of memory. The object manager can also implement a memory management process that can delete an object (e.g., image) from any type of memory when some conditions are met. The object manager can also implement rules and polices for storing some types of objects in a first memory (e.g., native memory) and other types of objects in a second type of memory (e.g., JAVA heap). Storing objects in memory is discussed in more detail below in relation to FIGS. 3, 4, 6A, and 6B.

In this disclosure, an "object" refers to data content that can be addressed and interpreted by a program (e.g., software program or mobile application). Mobile applications frequently use objects, e.g., images, videos, audio files, data structures, classes, graphics, numbers, pointers, symbols, etc.

Mobile devices running mobile applications have historically used memory available in the JAVA heap to store large objects, such as images. For example, when a mobile device user accesses an object in a mobile application implementing JAVA, the JAVA runtime allocates memory for the accessed object in the JAVA heap. When the object is no longer required (e.g., when the object is "out of scope" or is no longer reachable by any code that is still capable of being executed) a JAVA garbage collection process deletes the object from heap memory, thereby making the heap memory available for other objects. In some cases, the JAVA heap is limited to 128 MB or less of memory. Also, the JAVA garbage collector can be slow and can require significant processing resources. For example, a mobile application with an ANDROID-operated system running a JAVA virtual machine (JVM) can be halted completely (e.g., freeze the mobile application) while the JVM carries out garbage collection of several images, which can result in an undesired experience for users.

In some implementations, the object manager can address these problems by accessing and using native memory or shared memory of a mobile device to handle objects, such as images. For example, the object manager can access and use native memory (e.g., the "C-heap" used by a C++ operator), which has significantly more memory than the JAVA heap. In addition, objects in the native memory may not be deleted by the JAVA garbage collector. Thus, a mobile application using a JVM with some objects stored in the native memory can provide a faster and more satisfying experience for mobile device users due to the garbage collection systems executing less often and therefore requiring less resources. This increases memory availability in the JAVA heap and reduces the amount of processing for the JAVA garbage collector. One advantage of the object manager performing memory management in native or alternative memory is that the JAVA garbage collector has a reduced load for memory management, which allows for a faster performance in mobile applications using JAVA. Storing objects in native memory is discussed in more detail below in relation to FIGS. 3-5 and 6B.

In some implementations, the object manager can utilize another type of shared memory. For example, the object manager can use ANDROID shared memory ("ashmem") to store images. The object manager can lock (e.g., pin) an image to free ashmem memory, and later the object manager can unlock (e.g., unpin) the object. Ashmem is not managed by the JAVA garbage collection systems, instead the object manager can implement reference counting and pointer classes in the ashmem to manage memory and avoid memory leaks. Storing objects in ashmem is discussed in more detail below in relation to FIGS. 3, 5, and 6A In some implementations, the object manager can assist mobile devices in progressively displaying images from one or more different data sources. The object manager can initially display a lower quality image while waiting to download and display a higher quality image. The lower quality image can be associated with a first readily available data source. The second data source may be a higher quality image that takes longer to process (e.g., decompress and/or download). Although the first data source is displayed, the object manager can progressively display portions of the second data source in addition to portions of the first data source. For example, a mobile device user can request to view an image on a mobile application feed. The user can select a thumbnail version of an image, and initially the object manager can display a scaled version of the thumbnail image as a placeholder. The object manager can concurrently request a high resolution version of the image from a network, and progressively increase the resolution of the placeholder image as the high resolution version is downloaded from the network. Progressively displaying images is discussed in more detail with relation to FIG. 8.

In some implementations, the object manager can choose to display images from local memory, cache, or the network sequentially or in parallel. For example, if the object manager determines that an image is available in local memory, it will instruct the mobile device to display the image from local memory instead of retrieving the image from the network. The object manager can also display a combination of images from local memory and the network. For example, the object manager can instruct the mobile device to display a low quality image available on local memory while a higher quality image is processed or downloaded. When the higher quality image or a portion of the higher quality image is available, the object manager can display portions of both images or only the higher quality image. In some implementations, the object manager can fetch and display images in any order (e.g., in serial or in parallel). Obtaining images from specified locations is discussed below in more detail with reference to FIG. 7.

The object manager can advantageously use native memory and ashmem that is not traditionally available to mobile applications or the JVM to store and use objects. Further, the object manager can reduce the load on a mobile device central processing unit (CPU) because the object manager can shift object storage away from the JAVA heap to reduce the heavy and intense process of garbage collection in the JAVA heap. The object manager can also enable a mobile device to store less information in JAVA heap memory, a limited resource for mobile devices. In addition, the object manager can close the logical and sometimes physical separation between different types of memory in a mobile device because it can allow for a centralized process for storing, modifying, and accessing objects. Furthermore, the object manager can display images on a mobile device quickly and in a progressive manner, which can increase user satisfaction. Also, the object manager can retrieve images that are located in different areas (e.g., local memory, cache, network, etc.) in parallel or sequentially to provide a placeholder image while a higher resolution image is progressively displayed.

Figure 1:
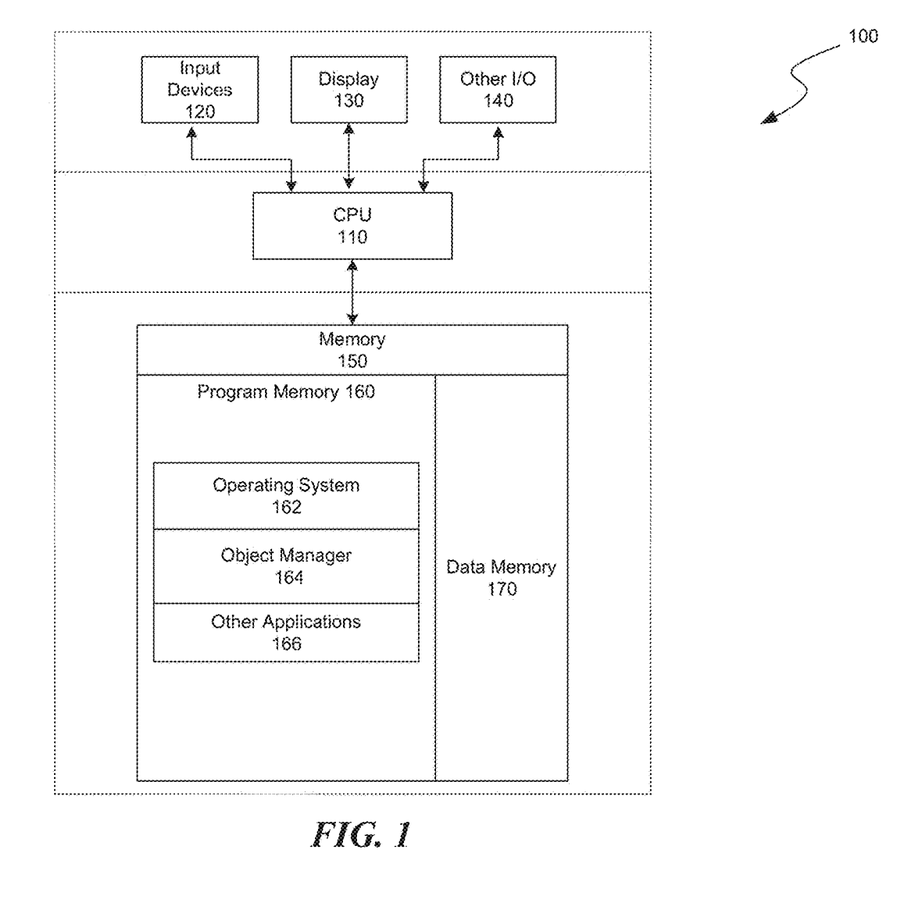
FIG. 1 is a block diagram illustrating an overview of a device in accordance with some implementations of the disclosed technology.

Turning now to the figures, FIG. 1 is a block diagram illustrating an overview of a device 100 in accordance with some implementations of the disclosed technology. Device 100 can include one or more input devices 120 that provide input to a central processing unit 110 (CPU, also known as the processor). A hardware controller can interpret signals received from the input devices 120 and communicate the information to CPU 110 using a communication protocol. Input devices 120 can include a button, a mouse, a keyboard, a touchscreen, an infrared sensor, a touchpad, a wearable input device (e.g., an electronic watch, smart watch, headset device, etc.), a camera, a microphone, a controller on headphones, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. CPU 110 can communicate with a hardware controller for devices, such as for a display 130. Display 130 can be used to display images (e.g., portions of objects), text, and graphics. In some examples, display 130 provides images to a device user. In some implementations, display 130 includes the input device as part of the display, such as when the input device is a touchscreen or is equipped with an eye direction monitoring system. In such implementations, a user of device 100 can use the touchscreen of display 130 to select, edit, modify, drag-and-drop, or pop-and-hop an image displayed on display 130. In some implementations, display 130 is separate from input device 120. Examples of display devices are an LCD display screen, an LED display screen, a projected, holographic, or augmented reality display (such as a heads-up display device or a head-mounted device), and similar displays. Other input/output (I/O) devices 140 can also be coupled to the processor, such as a network card, video card, audio card, USB, firewire, or other external device.

In some implementations, device 100 also includes a communication device (not shown in FIG. 1) capable of communicating wirelessly or wire-based with a network node. The communication device can communicate with another device or a server through a network using, for example, TCP/IP protocols. Device 100 can utilize the communication device to distribute operations across multiple network devices.

CPU 110 has access to a memory 150. Memory 150 includes one or more of various hardware devices for volatile and non-volatile storage and can include both read-only and writable memory. For example, memory 150 can comprise random access memory (RAM), CPU registers, read-only memory (ROM), and writable non-volatile memory, such as flash memory, hard drives, and so forth. Also, memory 150 can include a virtual machine in memory 150 that is the physical location of the virtual memory. A memory is not a propagating signal divorced from underlying hardware; rather, a memory is non-transitory. Memory 150 can include program memory 160 that stores programs and software, such as an operating system 162 (e.g., ANDROID), object manager 164, and any other application programs 166. For example, memory 150 can include other applications 166 for sports, shopping, or social media mobile application. Memory 150 can also include data memory 170 that can include objects such as images, videos, application requests and responses, configuration data, settings, or user preferences, which can be provided to the program memory 160 or any element of the device.

Figure 3:
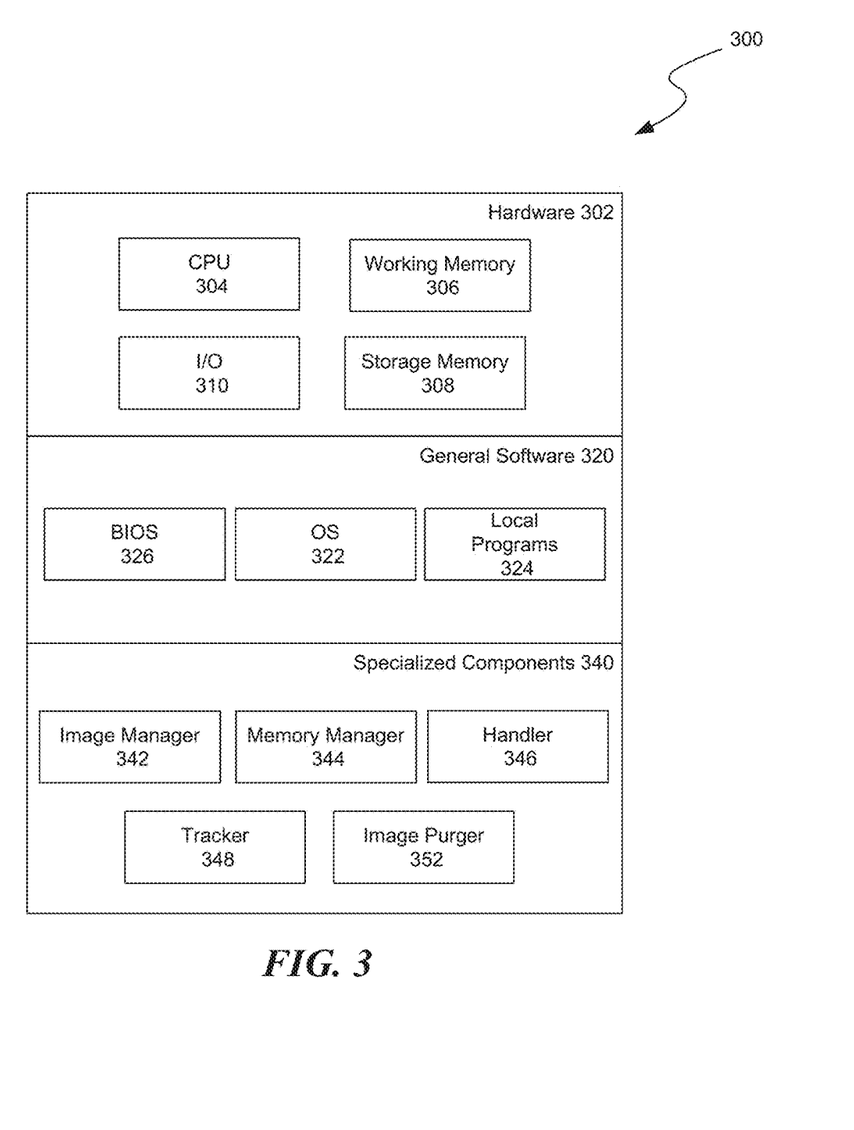
FIG. 3 is a block diagram illustrating components that can be used in accordance with some implementations of the disclosed technology.
Figure 4:
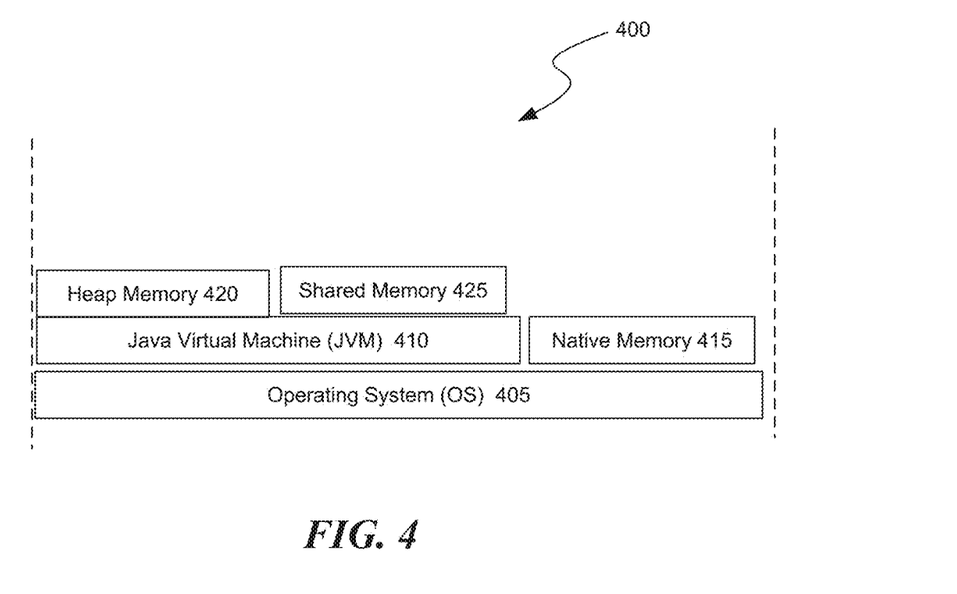
FIG. 4 is a block diagram illustrating a schematic overview of memory for a device used in accordance with some implementations of the disclosed technology.

Memory 150 is described in more detail in FIG. 4. As described in FIG. 4, memory 150 can include native memory, heap memory (e.g., JAVA heap memory), and shared memory (e.g., ashmem). Also, memory 150 can include object manager 164, which can include several software modules described below in relation to FIG. 3. In general, a user can use device 100 to view, modify, or store images that are in mobile applications (e.g., other applications 166). For example, a user of device 100 can view a picture of his friend on a newsfeed in a social media mobile application using display 130.

The disclosed technology can be operational with numerous other general purpose or special purpose computing system environments or configurations. Examples of well-known computing systems, environments, or configurations that may be suitable for use with the technology include, but are not limited to cellular telephones (e.g., smartphones with ANDROID operating systems), tablet devices, handheld devices, wearable electronics, and other mobile computing devices.

Figure 2:
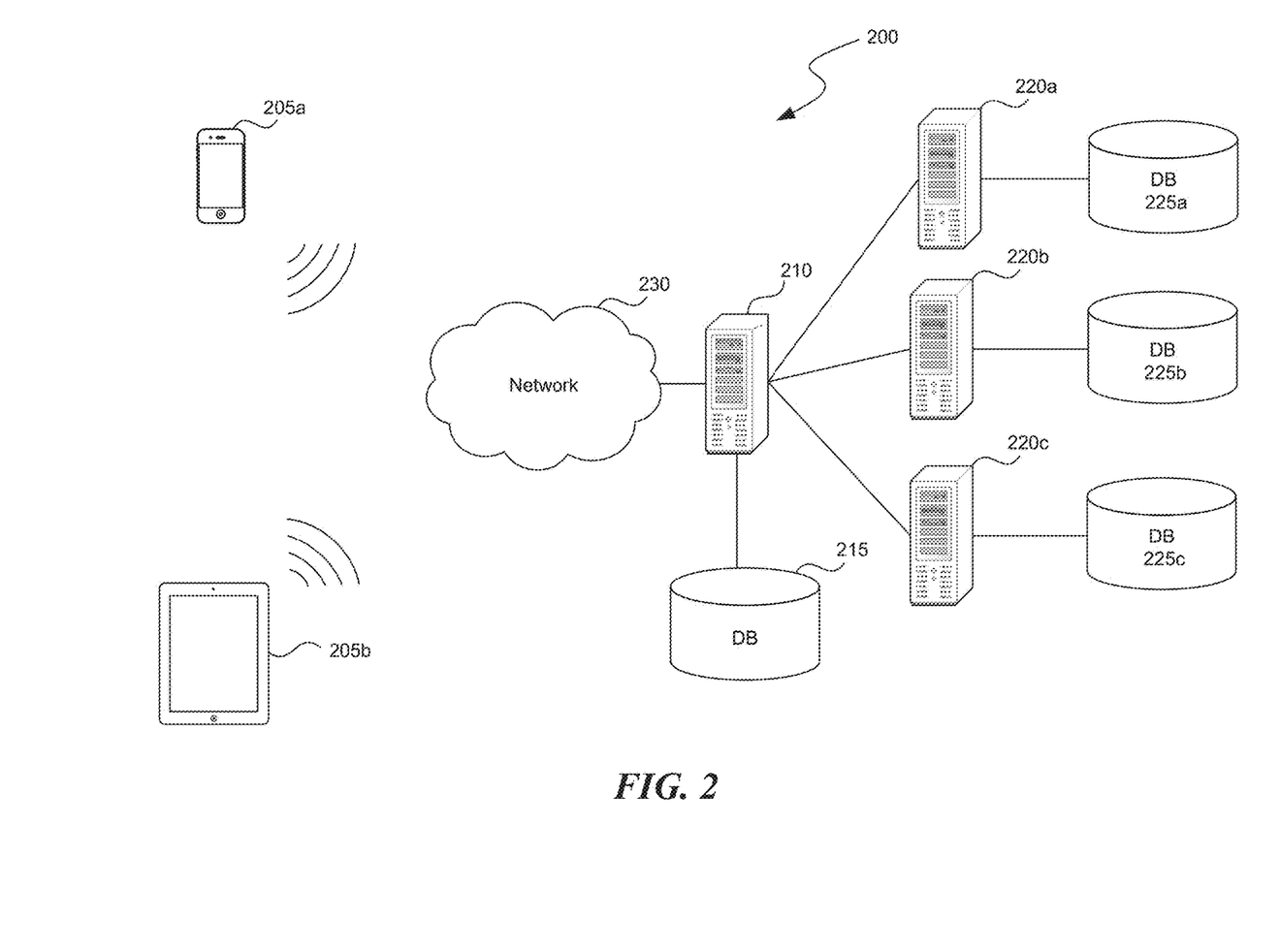
FIG. 2 is a block diagram illustrating an overview of an environment in accordance with some implementations of the disclosed technology.

FIG. 2 is a block diagram illustrating an overview of an environment 200 in accordance with some implementations of the disclosed technology. Environment 200 can include one or more client computing devices 205a-b, which can be device 100. Client computing devices 205a-b can operate in a networked environment using network 230. For example, client computing device 205a can be a smartphone with ANDROID operating system, and the client computing device 205a user can request to view an image that is stored on the client computing device 205a. Also, client computing devices 205a-b can be configured to communicate over network 230 to retrieve a data object (e.g., an image).

In some implementations, a server 210 can be an edge server that receives client requests and coordinates fulfillment of those requests through other servers, such as servers 220a-c. Though each server 210 and 220a-c is displayed logically as a single server, each server can be a distributed computing environment encompassing multiple client computing devices 205a-b located at the same location or at geographically disparate physical locations. In some implementations, each server 220a-c corresponds to a group of servers.

Server 210 can connect to a database 215. Servers 220a-c can each connect to a corresponding database 225a-c. As discussed above, each server 220a-c can correspond to a group of servers, and each of these servers can share a database or can have a single database 215 or multiple databases 225a-c. Databases 215 and 225a-c can warehouse (e.g., store) information such as images, videos, documents, emails, files, and other objects. Databases 215 and 225a-c can also store data associated with mobile applications that are installed on client computing devices 205a-b such as data used for mobile applications. Though databases 215 and 225a-c are displayed logically as single units, databases 215 and 225a-c can each be a distributed computing environment encompassing multiple client computing devices 205a-b, can be located within their corresponding server, or can be located at the same location or at geographically disparate physical locations.

Network 230 can be a local area network (LAN), a wide area network (WAN), a combination of LAN and WAN networks, or other wired or wireless networks. Network 230 can be the Internet or some other public or private network. The client computing devices 205a-b can be connected to network 230 through a network interface, such as by wired or wireless communication. While the connections between server 210 and servers 220a-c are shown as separate connections, these connections can be any kind of local, wide area, wired, or wireless network, including network 230 or a separate public or private network. For example, an ANDROID-operated smartphone can connect to network 230 using a Long Term Evolution (LTE) or 4th generation (4G) mobile network.

FIG. 3 is a block diagram illustrating components 300 that can be used in accordance with some implementations of the disclosed technology. The components 300 include hardware 302, general software 320, and specialized components 340. As discussed above, a system implementing the disclosed technology can use various hardware including central processing units 304, working memory 306, storage memory 308, and input and output ("I/O") devices 310. Components 300 can be implemented in a client computing device such as client computing devices 205a-b (as shown in FIG. 2).

General software 320 can include various applications, including an operating system 322 (e.g., any version of ANDROID, iOS, WINDOWS, etc.), local programs 324, and a basic input/output system (BIOS) 326. Specialized components 340 can be subcomponents of a general software 320, such as local programs 324. Specialized components 340 can include an image manager 342, a memory manager 344, a handler 346, a tracker 348, and an image purger 352. In general, all or some of the specialized components 340 can be included in the object manager 164

(as shown in FIG. 1). Specialized components 340 can communicate with other applications 166 (as shown in FIG. 1) (e.g., a sports application, a social media mobile application, a weather application, etc.).

The image manager 342 can be configured to manage the display of images on a device and to retrieve images. For example, the image manager 342 can respond to a request to display a high quality image by first displaying a scaled low quality version of the image (e.g., a thumbnail image that is enlarged) as a placeholder. Then the image manager 342 can send a request for a high quality version of the placeholder image. The image manager 342 can partially display the high quality image as it is downloaded from network 230. Image manager 342 can display portions of the high quality image concurrently with portions of the low quality version as the high quality image is downloaded or after the download of the high quality image is complete. For example, a user who is reading a story in a newsfeed using a mobile application on client computing device 205a can select a small profile photo of a person in the newsfeed as a link to another webpage or area that contains a high quality version of the photo. When the linked webpage or area opens, the image manager 342 can first instruct the mobile device to display the small profile photo in a scaled version (e.g., low resolution) and request a high resolution or larger profile photo from the network. While the high resolution image is downloading, the image manager 342 can display a low quality, small profile photo (instead of an empty box, loading symbol, or received portions of the high quality photo), and can increase the resolution (e.g., enhance) the low resolution version as the high quality version image is downloaded. The image manager 342 can perform the tasks of getting an image and displaying an image concurrently or sequentially. Additional details on progressively displaying images are described below in relation to FIG. 8.

The image manager 342 can access associations between different versions of the same image. For example, the image manager 342 can access a list that includes URIs to each version of the image (e.g., the thumbnail version of the image, the local cache version of the image, the URL version of the image, the network available version of the image). The image manager 342 can use this list to determine that it has more immediate access to one version of an image, even if it is not a version preferred for a particular page. In the above example, where a user selects a newsfeed link with a thumbnail version of an image, the list accessed by the image manager 342 can contain a match between the locally available thumbnail version and a larger image in a page that opens as a result of the user selection. Based on this match, the image manager 342 can use the thumbnail version until all or portions of the larger image have been downloaded.

The image manager 342 can also be configured to prioritize the display of images. In some implementations, the image manager 342 can receive a request from a mobile application to display an image, and in response, the image manager 342 can determine whether the image is available in the device's local memory or whether an image is available from a network resource. In some implementations, the image manager 342 can store an association between different versions of the same image, and prioritize the list. For example, the image manager 342 can store a list for each image, and the list can include URIs to each version of the image (e.g., the thumbnail version of the image, the local cache version of the image, the URL version of the image, the network available version of the image). The image manager 342 can prioritize local images that are low quality (e.g., low resolution, same in size) higher than images that are available on a network and high quality. The image manager 342 can send requests for these images simultaneously or sequentially. For example, the image manager 342 can use a uniform resource identifier for available local or network images. Additional details on prioritizing the display of images are described below in relation to FIG. 7.

The image manager 342 can also be configured to load the first available image. In some implementations, the image manager 342 can determine that there are multiple URIs for the same image, can attempt to obtain multiple simultaneously, and can use the one that is obtained first. In some implementations, the image manager 342 can determine that there are multiple URIs for the same image and can use a hierarchy specified among types of locations to determine an order in which attempt to obtain the image. For example, a mobile device can have a URI for an image taken from a mobile device camera, an URI for a downscaled version of the same image, and URI for a network location of the same image. In this example, the mobile device can also have a hierarchy specifying that local versions should be obtained prior to obtaining versions from a network resource and that downscaled versions should be obtained prior to obtaining larger versions. In such case, the image manager 342 can first try to get the local-downscaled URI, then if that fails, try to get the local-original URI, and if that fails, try to get the network-uploaded URI. One advantage of this is that avoiding downloading an image until it is "necessary," and this avoids the costs of downloading an image. In some implementations, the hierarchy can specify that the image manager 342 first queries cache mobile device memory, then the disk cache, and only then goes out to the network or other source. Additional details on loading and displaying the first available image are described below in relation to FIG. 7.

The memory manager 344 can be configured to handle requests to store, modify, or access objects in memory. The memory manager 344 can communicate with other specialized components 340, such as the handler 346 or the image purger 352, to handle requests. In some implementations, a mobile device requests to store an object. In such implementations, the memory manager 344 can determine that the object should be stored in native memory instead of the JAVA heap because of the type of object, because the JAVA heap is nearly full, or because the object is large and will slow the mobile device if stored in the JAVA heap. The memory manager 344 can send instructions to the handler 346 (as described below) to carry out the process of storing the object in native memory. In some implementations, the memory manager 344 receives a request to store an image (e.g., a bitmap in ANDROID) from a mobile application. The memory manager 344 can compress or decompress the image, and can send instructions to the handler 346 to store the image. Additional details on managing and storing objects in native or alternative memory are described below in FIGS. 6A and 6B.

In some implementations, the memory manager 344 can determine that the image should be deleted from memory and can communicate with the handler 346 to delete the image from memory. For example, a mobile application can send a request to delete an image from memory because the user deleted the image or image is no longer required by the mobile application. The memory manager 344 can receive this request and communicate with the image purger 352 to carry out the operations to delete the image from memory. In general, the memory manager 344 can orchestrate requests from a device (e.g., device 100 as shown in FIG. 1 or client computing device 205a as shown in FIG. 2) or mobile applications on a device, and the memory manager 344 can communicate with the handler 346 to perform these requests.

In some implementations, the memory manager 344 can select a type of memory to store an object based on a type associated with the object. For example, the memory manager 344 can implement a policy that images are stored in the ashmem, and other types of objects are stored in native memory. As another example, the memory manager 344 can store large images (e.g., greater than 1.5 MB) in native memory and small images in the JAVA heap (e.g., less than 1 MB). An administrator or software developer can adjust the policy for storing one type of object in one memory and another type of object in another memory.

The handler 346 can be configured to store objects in different types of memory, modify objects in different types of memory, and move objects between different types of memory. In some implementations, the handler 346 creates and uses a "handle," which is a memory manager that can identify, read, and modify parts of multiple types of memory; a handle can implement references to an object stored in one memory but referenced in another memory. In some implementations, the handler 346 can store objects in heap memory (e.g., JAVA memory). In some implementations, the handler 346 can be configured to communicate with the "new" operator in the JAVA heap and "new" operator in C++. Also, the handler 346 can be configured to call operators in C/C++ such as the delete operator. The handler 346 can also include functions or classes for assigning blocks on memory in C++ to store objects. The handler 346 can be configured to communicate with specialized components 340, and general software 320, such as local programs 324, and the operating system 322 (e.g., ANDROID LOLLIPOP 5.0, ANDROID KITKAT 4.4, ANDROID JELLY BEAN 4.1-4.3).

Tracker 348 can be configured to implement a collection algorithm such as reference counting for objects in non-heap memory (e.g., native memory, ashmem). In some implementations, tracker 348 determines a count for each object in memory that is referenced. In such implementations, tracker 348 can be configured to delete an object if a reference count for an object is computed to be zero. Tracker 348 can be configured to implement the Deutsch-Bobrow method of reference counting (e.g., deferred reference counting references), the Henry Baker method of reference counting, the Dijkstra-Scholten method of reference counting, a mark and sweep algorithm, concurrent and incremental garbage collection, weighting reference counting, or general garbage collection.

The image purger 352 can be configured to communicate with shared memory (e.g., ashmem), and configured to modify or store objects in shared memory. In some implementations, the image purger 352 can receive requests from other specialized software components, such the image manager 342. For example, the image manager 342 can send instructions to the image purger 352 to delete an object in ashmem or unlock an object in ashmem. In some implementations, the image purger 352 can implement deferred releasing (i.e., a mechanism to prevent early resource release). For example, the image purger 352 can delay the unlocking of an object (e.g., delaying the unpinning of a bitmap in ashmem) until the image purger receives a request to use more memory in ashmem.

Locking memory can prevent an object in memory from being subject to automatic removal in memory management processes. For example, the image purger 352 can lock an image (e.g., pin an uncompressed image) to memory (e.g., ashmem), which prevents the object from being purged by a memory manage process (e.g., garbage collection). In some implementations, the image purger 352 can "pin" an image to memory when a mobile device is rendering the image, and "unpin" the image when the mobile device is finished. For example, the image purger 352 can pin an image while the image is on a newsfeed in a social media mobile application, and unpin the image when the image moves off-screen, has been off-screen for more than a threshold amount of time, or is deleted. In some implementations with an ANDROID-operated device, the image purger 352 call functions "AndroidBitmap_lockPixels" and "unlockPixels" to lock or unlock bitmaps of images in the ashmem.

In some implementations, the image purger 352 tracks reference counts for objects in ashmem. Once the reference count goes to zero, the image purger 352 can implement a disposal method (e.g., implement ANDROID function "asBitmap.recycle") to purge the image in ashmem. The image purger 352 can also implement other functions to assist in reference counting functions and image purging, such as "SharedReference," "builtCloseableReference," "clone( )," "addReference( )," "close( )," and "callsdeleteReference( )," as described in ANDROID.

FIG. 4 is a block diagram illustrating a schematic overview of memory 400 for a device used in accordance with some implementations of the disclosed technology. Memory 400 can be memory 150 in FIG. 1. For example, the operating system 162 in FIG. 1 can be the operating system 405 in FIG. 4 (e.g., ANDROID). Memory 400 can include an operating system (OS) 405, a JAVA virtual machine (JVM) 410, native memory 415, heap memory 420 (e.g., JAVA heap memory), and shared memory 425 (e.g., ashmem, also known as ANDROID shared memory). Shared memory 425 can be alternative memory. The OS 405 can be ANDROID. The JVM 410 can be a software implementation of a computer that executes programs like a real machine. In some implementations, a virtual computing platform or computing platform is JVM. In some implementations, a virtual computing platform or computing platform a virtual machine that is compatible with JAVA. The JVM 410 can be written specifically for an operating system 405 (e.g., ANDROID or LINUX). Also, shared memory 425 can be shared memory 425 specific to an ANDROID operating system (ashmem). The heap memory 420 and shared memory 425 can be physically and logically separately as illustrated in FIG. 4.

In FIG. 4, information can be transferred between portions of memory to manage memory for a device (e.g., device 100). In some implementations, the memory manager 344 facilitates communicate between these portions of memory 400. OS 405 can communicate with the JVM 410, heap memory 420, and shared memory 425. Native memory 415 can be operating system allocated memory that is non-heap memory and is available to the runtime process (e.g., code optimization, bookkeeping, etc.). For example, the JVM 410 can use native memory 415 for bookkeeping.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc.

Figure 5:
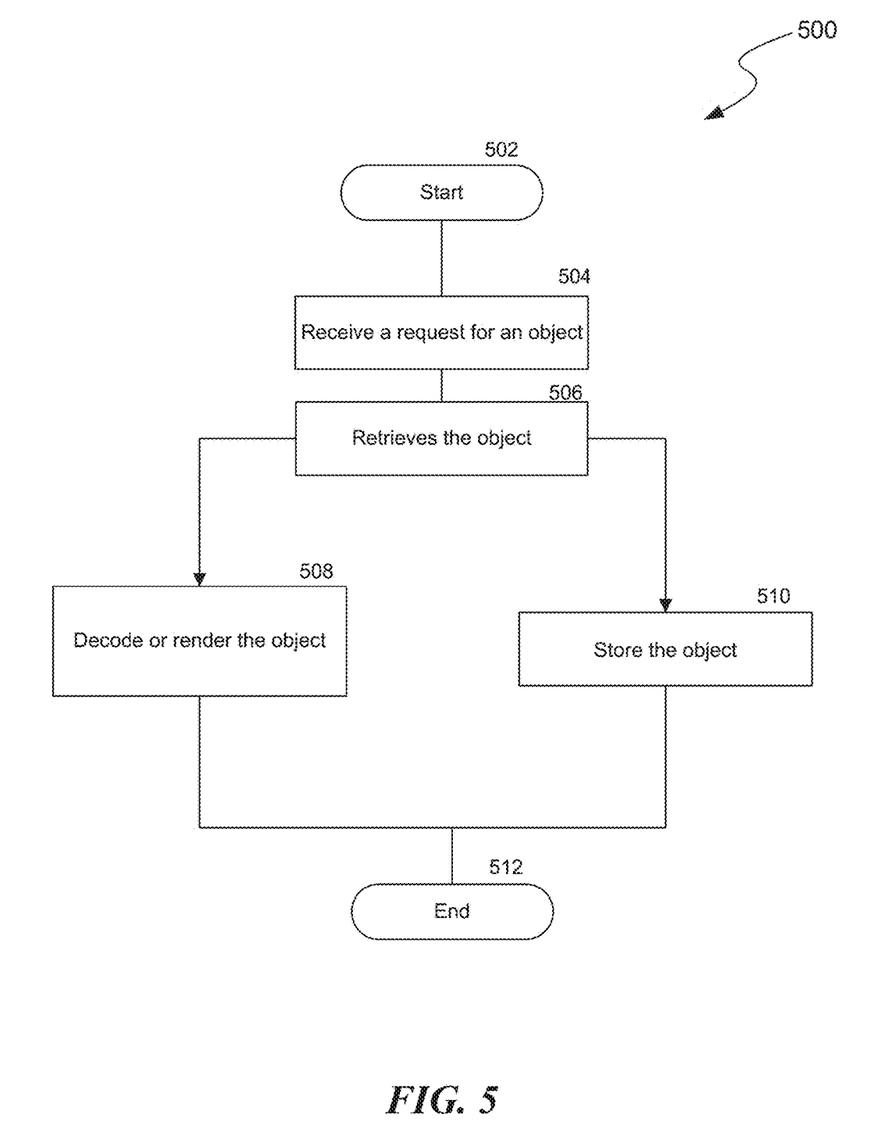
FIG. 5 is a flow diagram illustrating a process used in accordance with some implementations of the disclosed technology for receiving and rendering an object.

FIG. 5 is a flow diagram illustrating a process 500 in accordance with some implementations of the disclosed technology for that can be used for receiving and rendering an object. Process 500 begins at block 502 and continues to block 504. In some implementations, process 500 can be performed in response to a request to display, modify, or store an image on a mobile device. In some implementations, process 500 can be performed in response to a mobile device user request. In some implementations, process 500 can be performed in response to a user changing pages, views, or windows in a mobile application (e.g., a social media mobile application). In general, process 500 can include receiving an object and responding to requests to store, modify, or render the object.

At block 504, process 500 can receive a request for an object. For example, a mobile device user (e.g., client computing device 205a) can request to display a high-resolution, but slow-to-download, image. In such an example, the mobile device user can be using an ANDROID-operated smartphone and a social media mobile application. As another example, a mobile application can request to view an image or to store an image in memory (e.g., native memory, ashmem, or the JAVA heap). The image can be, for example, in Joint Photographic Experts Group (JPEG) format either compressed or uncompressed.

At block 506, process 500 can retrieve the object. In some implementations, a device user can request a high resolution image to view in a mobile application, and a mobile device can send multiple queries (e.g., to the operating system, local cache memory, JAVA heap, alternative memory, and memory specific to a camera) to retrieve the high resolution image. In some implementations, a mobile device can first retrieve (and then display) the first available image (e.g., a low quality image available as a thumbnail in a mobile application). In some implementations, a mobile device can progressively display a higher resolution image that is available on the network 230 in combination with or in addition to the placeholder low resolution image. More details regarding retrieving an image are described with reference to FIGS. 7 and 8.

At block 508, process 500 can decode or render the object. In some implementations, the object (e.g., image) can be decompressed or decoded (e.g., unencrypted) and displayed on display 130. In some implementations, process 500 can decode and then render a local high resolution image that a user requested. For example, if a user used a camera connected to device 100 to capture the high resolution image, process 500 can decode and display the image on display 130. As another example, if a user with a social media mobile application requests to view an image, the image manager 342 can downsize a version of the image, and display the downsized image in the mobile application.

At block 510, process 500 can store the object. In some implementations, process 500 can store an object in native or alternative memory. Process 500 can store objects in native or alternative memory in response to a request from a mobile device, mobile application, or operating system. The process of storing an object in native or alternative memory is further described in FIGS. 6A-6B. After blocks 508 and 510, process 500 then proceeds to block 512, where it ends.

Figure 6A:
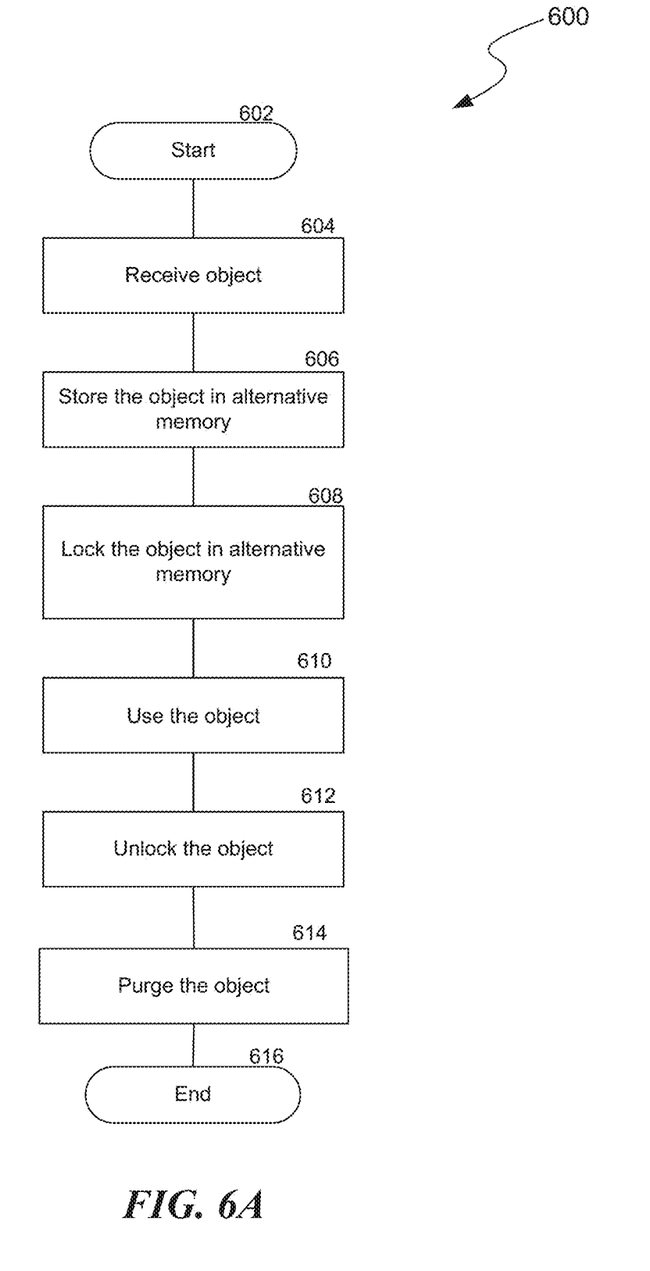
FIG. 6A is a flow diagram illustrating a process for managing an object in alternative memory in accordance with some implementations of the disclosed technology.

FIG. 6A is flow diagram illustrating a process 600 for managing an object in alternative memory in accordance with some implementations of the disclosed technology. Process 600 begins at block 602 and continues to block 604. In some implementations, process 600 can begin when a mobile application requests to store an object, such as at block 510. In some implementations, process 600 can begin if the operating system for a mobile device (e.g., ANDROID) requests to store an object (e.g., image) in alternative memory. In some implementations, process 600 can begin when a JVM requests to store an object in alternative memory (e.g., ANDROID ashmem).

At block 604, process 600 can receive an object. In some implementations, the object is received from a mobile application. While not shown in FIG. 6A, an object can first be stored in the JAVA heap or other memory, and the memory manager 344 can move the object from memory (e.g., the JAVA heap) to alternative memory (e.g., ashmem). For example, a user with a social media mobile application on an ANDROID-operated smartphone can open the social media mobile application to a new page or different part of a newsfeed. The new page or newsfeed can include an image that was downloaded from a network, e.g. network 230. The mobile application can request to store the image.

At block 606, process 600 can store the object in alternative memory. In some implementations, the memory manager 344 communicates with the image purger 352, and instructs the image purger 352 to store the object in alternative memory. For example, after a mobile application receives an image from the network, a mobile device running the mobile application can instruct the operating system of the mobile device to store the image in ashmem. In such an example, the image can be picture of a person (e.g., profile picture) in a social media mobile application, and the user can scroll through a newsfeed, which moves the image onscreen and offscreen.

At block 608, process 600 can lock the object in alternative memory. Locking an object in alternative memory can prevent the object from being deleted/purged. In some implementations, the image purger 352 can lock an object in alternative memory by executing functions (e.g., code) that prevents it from being visible to garbage collection or marks the object so that functions know not to delete or purge the object. For example, the image purger 352 can lock an uncompressed image received from a social media mobile application, and the image purger 352 can call functions "BitmapFactory.Options," "options.inPureable," or "AndroidBitmap_lockPixels," to lock a bitmap of the uncompressed image in the ashmem of an mobile device operating ANDROID. Locking the bitmap can also be understood as "pinning" the bitmap. Process 600 can lock (e.g., pin) the bitmap as long as the social media mobile application is using the image.

At block 610, process 600 can use the object. In some implementations, client computing devices 205a-b can use (e.g., view, modify) the object that is stored and locked in alternative memory. For example, a user can view a picture of his favorite sports team using a sports mobile application. One advantage of locking an image is avoiding garbage collection because garbage collection can cause stalls, delays, or crashes in mobile applications. Also, in some implementations, as long as the object is in use, the image can remain locked in alternative memory.

At block 612, process 600 can unlock the object from alternative memory. In some implementations, similar to locking an object as described above, unlocking an object can require calling functions to reverse the operations of functions that locked the object, such as "unlockPixels" in ANDROID. In such an example, the mobile application can be a ESPN mobile application, and the image can be a picture the user was viewing, or had previously viewed, inside the application.

At block 614, process 600 can purge the object from alternative memory. Process 600 then proceeds to block 616, where it ends. In some implementations, the memory manager 344 can execute code (e.g., functions and classes in C++) that causes the memory manager 344 to track the reference count of locked and unlocked objects and to delete objects when the objects are no longer referenced. In some implementations, once an object is unlocked, the object is susceptible to disposal (e.g., ANDROID implements "bitmap.recycle" to delete the unlocked object when the mobile device requests to use more space in the ashmem).

Figure 6B:
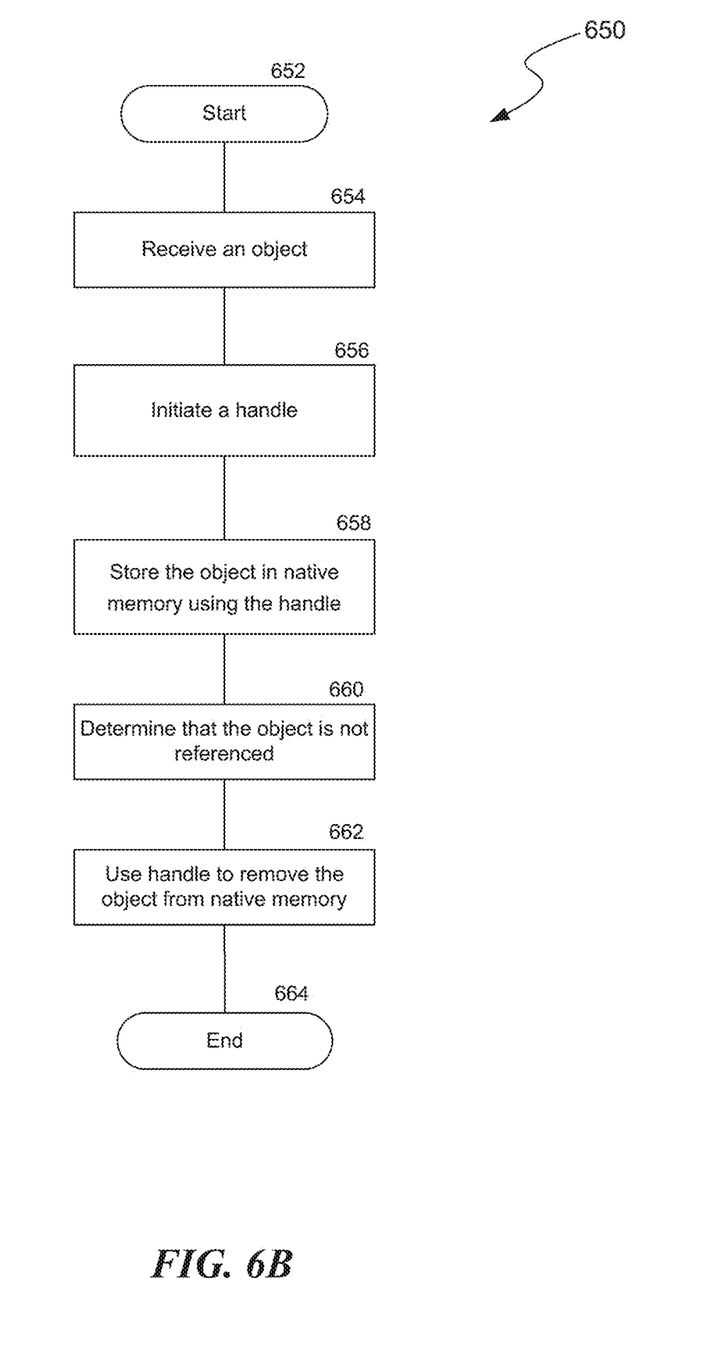
FIG. 6B is a flow diagram illustrating a process for managing an object in native memory in accordance with some implementations of the disclosed technology.

FIG. 6B is a flow diagram illustrating a process 650 that can be used for managing an object in native memory in accordance with some implementations of the disclosed technology. Process 650 begins at block 652 and continues to block 654. In some implementations, process 650 can be performed in response to a request from a mobile device. In some implementations, process 600 can begin when a mobile application requests to store an object, such as at block 510.

At block 654, process 650 can receive an object. In some implementations, the object is received from device 100 or a mobile application (e.g., other applications 166). For example, a user with a social media mobile application on an ANDROID operated smartphone can open the social media application to a new page or different part of a newsfeed. The new page or newsfeed can include an image (e.g., the object that was retrieved from a network). The image can be in format that ANDROID or JAVA can handle, such as bitmap. The memory manager 344 can receive the image in bitmap form and proceed to store the object in the native memory. In some implementations, process 650 can receive an object from the JAVA heap, and the memory manager 344 can move the object from the JAVA heap to another memory (e.g., native memory).

At block 656, process 650 can initiate a handle. In general, the memory manager 344 communicates with the handler 346 (as shown in FIG. 3) to initiate a handle. In some implementations, the handle communicates with native memory 415 (as shown in FIG. 4) on a mobile device, and the handle locates memory available to store an object in native memory 415 (e.g., the handle can use C++ operators to designate the location to store the object). In some implementations, the handle can pass or transfer an object from one memory (e.g., the JAVA heap) to another memory (e.g., native memory). For example, the memory manager 344 can receive an object and communicate to the handler 346 to initiate a handle to store the object in native memory 415. In such an example, the object can be an image of a house used in a third party mobile application.

At block 658, process 650 can store the object in native memory 415 using the handle. In some implementations, the handler 346 uses the handle established at block 656 to store an object in native memory 415. For example, the image of the house in the third party mobile application is stored to native memory 415, and the third party application can access the image in native memory 415.

At block 660, process 650 can determine that the object is not referenced. In some implementations, the tracker 348 implements a reference counting algorithm, and manages the reference count of objects in the native memory 415. For example, the third party mobile application can reference a picture of a house once on a page or feed, and again in another part of the page or feed. In such an example, the reference count would be two. In some implementations, a mobile application can close and thus not reference any data objects in native memory 415. For example, a user can select to close the third party mobile application after viewing an image of a house, and when the third party mobile application closes, the reference count of the image in native memory 415 goes to zero. In such an example, the tracker 348 can notify the memory manager 344 that the reference count for the image is zero, and the memory manager 344 can proceed to delete the image from native memory.

At block 662, process 650 can use a handle to remove the object from native memory 415. In some implementations, the memory manager 344 uses the handler 346 to delete an object that has a reference count of zero in native memory 415. After the object is deleted, process 650 then proceeds to block 664 where process 650 ends. In some implementations, the process can be repeated for new objects; for example, as when a user opens a mobile application with new objects.

Figure 7:
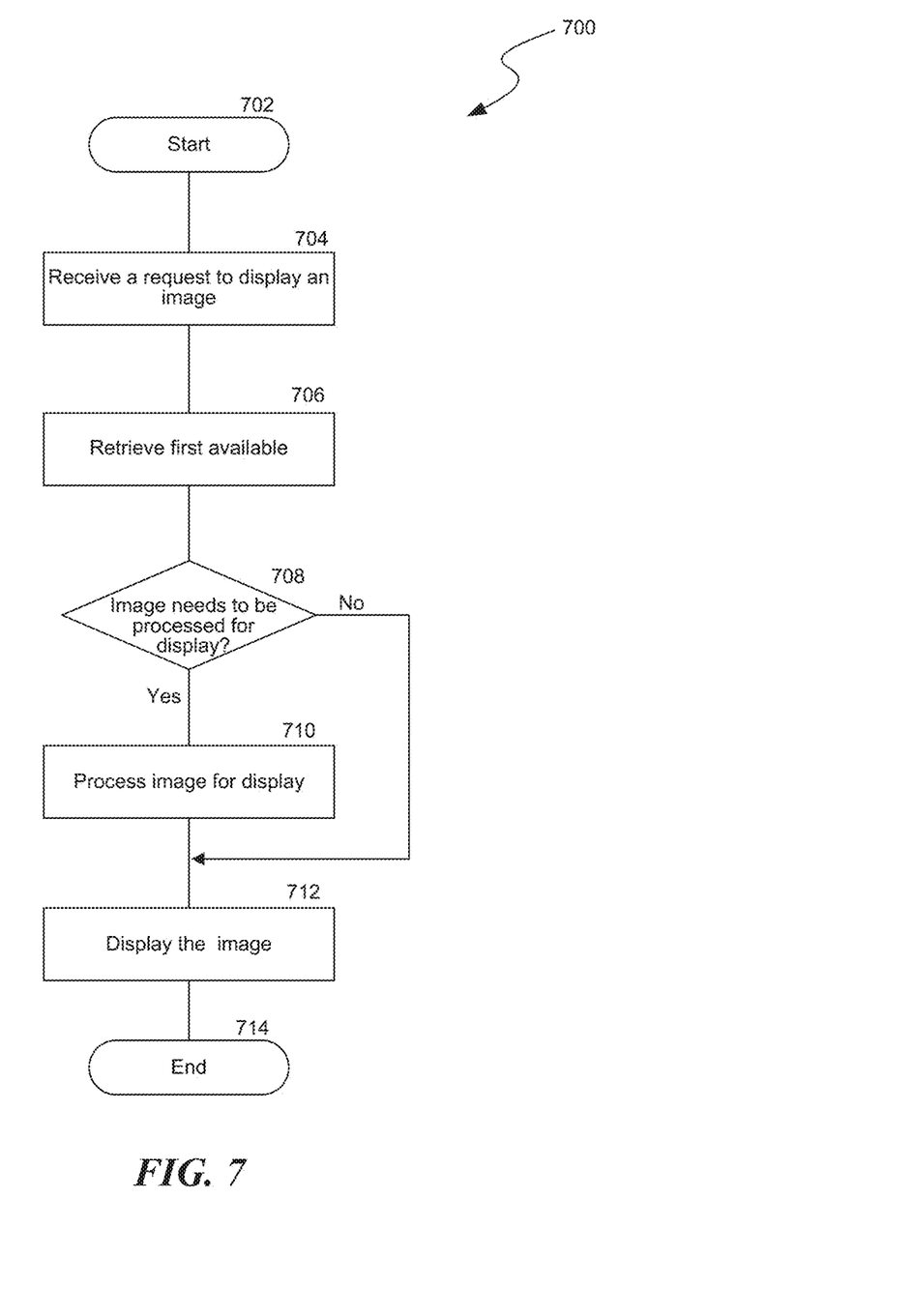
FIG. 7 is a flow diagram illustrating a process for displaying a first available image in accordance with some implementations of the disclosed technology.

FIG. 7 is flow diagram illustrating a process 700 for displaying a first available image in accordance with some implementations of the disclosed technology. Process 700 begins at block 702 and continues to block 704. In some implementations, process 700 can be performed in response to a request to display an image in a mobile application, such as at block 508. In some implementations, process 700 can be performed in response to a mobile device user request. In some implementations, process 700 can be performed in response to a user changing pages, views, or windows in a mobile application (e.g., a social media application) or on a mobile device display (e.g., using an interactive web browser).

At block 704, process 700 can receive a request to display an image. For example, a mobile device user can request to display a high-resolution, slow-to-download image. In such an example, the mobile device user can be using an ANDROID-operated smartphone and a social media mobile application or other third party mobile application.

At block 706, process 700 can retrieve the first available image. In some implementations, a mobile device simultaneously queries memory cache, disk cache, and a network source for the image and takes the first available image from any source. In some implementations, the mobile device retrieves a lower quality version of the image associated with a first readily available data source because a second data source with a higher quality version of the image takes longer to process (e.g., decompress, download). In some implementations, the mobile device can send a request to two uniform resource identifiers (URIs): one for the thumbnail image, and one for the high resolution version of the image on the network 230, and then retrieve the first available URI. In some implementations, the mobile device determines that there are multiple URIs for the same image. For example, a mobile device can store a list with a URI for an image taken from a mobile device camera, a URI for a downscaled version of the same image, and a URI for a network location of the same image. In such case, the mobile device can first try to get the URI for the downscaled version of the image, then if that fails, try to get the local-original URI in camera memory, and if that fails, try to get the network-uploaded URI.

If process 700 can determine at block 708 that an image needs to be processed for display, then process 700 can continue to block 710. In some implementations, processing for an image can be scaling (e.g., upscaling or downscaling), resizing, or downsampling. For example, if process 700 can get the first available image but the image is too large to display in a social media mobile application, then the image needs to be resized before display and proceeds to block 712. If process 700 can determine at block 708 that an images does not need to be processed for display, then process 700 can continue to block 714, where the process 700 ends. While not shown in FIG. 7, the image manager 342 can display the image if does not need any processing.

At block 710, process 700 can process an image for display. For example, if at block 708, process 700 determined that a image needs to be processed, image manager 342 can resize the image before displaying the image in a mobile application. At block 712, process 700 can display the image. For example, a social media mobile application displays a picture of a person, where the picture was available in a local cache and downsized to fit inside of the social media application viewer window. After block 712, process 700 then proceeds to block 714 where it ends.

Figure 8:
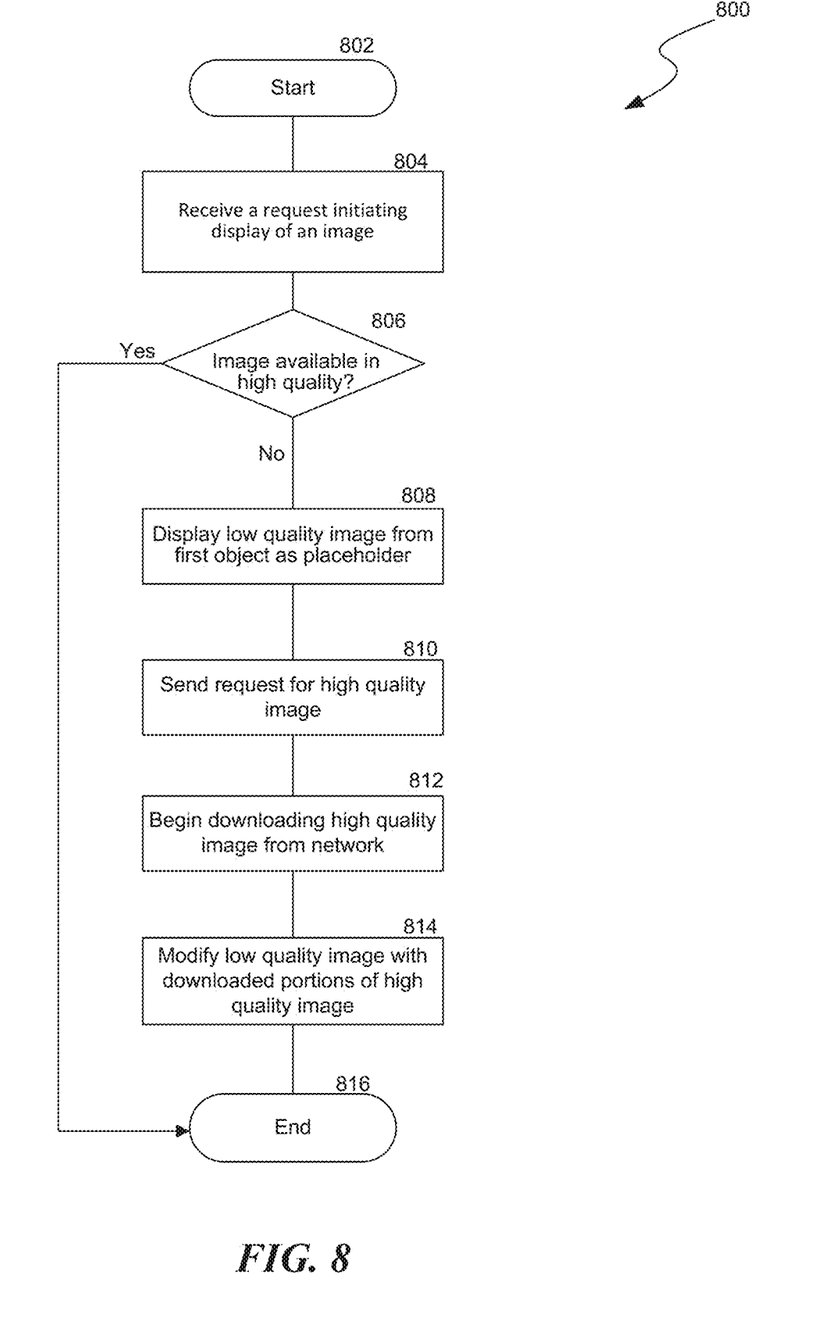
FIG. 8 is a flow diagram illustrating a process for progressively displaying an image in accordance with some implementations of the disclosed technology.

FIG. 8 is flow diagram illustrating a process 800 for progressively displaying an image in accordance with some implementations of the disclosed technology. Process 800 starts at block 802 and continues to block 804. At block 804, process 800 can receive a request initiating display of an image. In some implementations, process 800 can be performed in response to request to display an image in a mobile application, such as at block 508. In some implementations, the request can be initiated from a request to display a first object associated with a lower quality version of the image. For example, a user of a mobile application can request to view a high resolution version of a thumbnail profile picture in a social media mobile application. In some implementations, process 800 can be performed in response to a user changing pages, views, or windows in a mobile application (e.g., a social media mobile application) or on a mobile device display (e.g., using an interactive web browser). If process 800 determines at block 806 that an image is not available in high quality, process 800 continues to block 808. If process 800 determines that an image is available in high quality, the high quality version of the image is used and process 800 continues to block 816 where the process 800 ends.

At block 808, process 800 can display, as a placeholder, a low quality image from the first object. For example, a user can select a thumbnail version of an image, and a mobile device display can first display a scaled version of the thumbnail image as a placeholder. Concurrently, the mobile device can request a higher resolution version of the image from a network, and progressively increase the resolution of the placeholder image as the higher resolution version is downloaded from a network. As another example, a user can changes pages or scroll down on a feed of a mobile application, the new page or new section of the feed can contain a request to display a higher resolution of an image that was available in the previous page of section of the feed. The mobile device can display a scaled low-quality version of the image from the previous page or section of the feed as a placeholder.

At block 810, process 800 can send a request for a higher quality image. At block 812, process 800 can begin downloading the higher quality version of the image from network 230. For example, while a social media mobile application displays a scaled thumbnail image, a mobile device can request a high resolution version of the image from a network. Also, in some implementations, process 800 can be used in combination with relation to FIG. 7.

At block 814, process 800 can modify the low quality image with downloaded portions of a high quality image. In some implementations, a mobile device progressively displays portions of the higher quality version of the image concurrently with portions of the low quality version of the image. For example, the low quality version of the image can be used as base-layer data that can be augmented by using portions of the higher quality version as enhancement-layer data. In some implementations, while the first data source is displayed, a mobile device progressively displays a second data source in addition to the first data source. For example, a mobile device user can request to view an image on a mobile application feed. In response to the request, the mobile device can increase the quality of the placeholder image (e.g., add pixels or bits of image information) as the high resolution image from the network is downloaded and decoded. In such an example, the mobile application users notices a progressively more clear and high quality image appear until the download is finished. Process 800 then proceeds to block 816 where it ends.

Several implementations of the disclosed technology are described above in reference to the figures. The computing devices on which the described technology can be implemented can include one or more central processing units (e.g., CPUs 304 (as shown in FIG. 3), memory 150 (as shown in FIG. 1), input devices (e.g., touchscreens, touchpads, buttons), output devices (e.g., display devices), or storage devices (e.g. USB flash drives)). The memory 150 and storage devices are computer-readable storage media that can store instructions that implement at least portions of the described technology. In addition, data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiples of any item such as A and A; B, B, and C; A, A, B, C, and C; etc.

As used herein, a condition being "expected" or "likely" means that a value has been computed for the condition and the value computed for the condition is above a threshold value. As used herein, a first element is "similar" to a second element by virtue of values being assigned to the first and second elements and a comparison between these values indicates the difference is below a threshold level.

As used herein, being above a threshold means that a value set by an administrator or software developer. The administrator or software developer can modify the threshold value. For example, an administrator can determine that a threshold value of 3 seconds for an image being offscreen is a threshold value for deleting the image from memory (e.g., deleting it from native or alternative memory). In such an example, the administrator can change the threshold value to 8 seconds if the administrator determines that is 3 seconds is too short.

Although the subject matter has been described in language specific to structural features or methodological acts, it is to be understood that the subject matter defined in the appended claims is not necessarily limited to the specific features or acts described above. Specific implementations and implementations have been described herein for purposes of illustration, but various modifications can be made without deviating from the scope of the implementations and implementations. The specific features and acts described above are disclosed as example forms of implementing the claims that follow. Accordingly, the implementations and implementations are not limited except as by the appended claims.

Any references referred to above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

Also, this disclosure includes trademarks, which are capitalized wherever the trademarks appear.

We claim:

1. A method for managing memory on a mobile device, comprising:
    receiving, by a virtual computing platform having access to heap memory, an object;
    determining that the object should be stored in a non-heap memory that is logically separate from the heap memory of the virtual computing platform and that is not available to the virtual computing platform to store and use objects;
    storing the object in the non-heap memory logically separate from the heap memory; and
    creating a reference, in the heap memory, to the object, wherein the reference refers to the object in the non-heap memory logically separate from the heap memory;
    accessing, via the reference, the object in the non-heap memory logically separate from the heap memory;
    tracking a reference count for the object in the non-heap memory logically separate from the heap memory;
    determining that the reference count for the object is zero; and
    in response to determining that the reference count for the object is zero, deleting the object from the non-heap memory logically separate from the heap memory.

2. The method of claim 1, wherein tracking the reference count includes a weighted referencing counting algorithm.

3. The method of claim 1, wherein the virtual computing platform is a virtual machine.

4. The method of claim 1, further comprising receiving a request to store the object in the non-heap memory logically separate from the heap memory.

5. The method of claim 1, wherein the heap memory is less than 512 MB.

6. The method of claim 1, wherein the object is an uncompressed image received from a mobile application.

7. A computer-readable storage medium storing instructions that, when executed by a mobile device computing system, cause the mobile device computing system to perform operations for managing memory, the operations comprising:
    operations for receiving an object, wherein the object is received using an application executing in a virtual computing platform having access to heap memory;
    operations for determining to store the object in non-heap memory that is logically separate from the heap memory of the virtual computing platform and that is not available to the virtual computing platform to store and use objects;
    operations for storing the object in the non-heap memory logically separate from the heap memory;
    operations for sending instructions to lock the object in the non-heap memory logically separate from the heap memory, wherein locking the object prevents the locked object from being subject to automatic removal by memory management processes;
    operations for accessing, by the application, the object in the non-heap memory logically separate from the heap memory; and
    operations for unlocking the object in the non-heap memory logically separate from the heap memory, wherein unlocking the object causes the unlocked object to be subject to purging of the object from the non-heap memory logically separate from the heap memory by the memory management processes.

8. The computer-readable storage medium of claim 7, wherein the object is an image used by a mobile application, and wherein the mobile application uses the object multiple times within the mobile application.

9. The computer-readable storage medium of claim 7, wherein the non-heap memory logically separate from the heap memory is operating system shared memory on the mobile device.

10. The computer-readable storage medium of claim 7, wherein the object is a bitmap of an image.

11. The computer-readable storage medium of claim 7, wherein the mobile device computing system includes a virtual machine for garbage collection.

12. The computer-readable storage medium of claim 7, wherein the operations further comprise:
    tracking a reference count for the object in the non-heap memory logically separate from the heap memory, wherein the reference count is used by the memory management processes to delete the object when the reference count is zero.

13. A system for performing operations for memory management, comprising:
    one or more processors;
    a native memory that is not available to a virtual computing platform to store and use objects
    a heap memory, wherein the heap memory is logically separate from the native memory; and
    a memory manager storing instructions configured to, when executed by the one or more processors, cause the system to:
    receive an object from an application executing the virtual computing platform having access to the heap memory;
    determine to store the object in the native memory that is logically separate from the heap memory of the virtual computing platform;
    store the object in the native memory;
    create a reference for the object in the heap memory, wherein the reference points to the object in the native memory; and
    access, via the reference, the object in the native memory.

14. The system of claim 13, wherein the virtual computing platform is a virtual machine, and wherein the native memory stores an operating system for a mobile device.

15. The system of claim 13, further comprising:
    an operating system configured to allocate physical blocks of mobile device memory to the native memory and the heap memory.

16. The method of claim 1, wherein determining whether to store the object in either the non-heap memory or the heap memory that is logically separate from the heap memory is based on a data type of the object.

17. The method of claim 1, wherein determining whether to store the object in either the non-heap a memory that is logically separate from or the heap memory is based on whether the object is an image.

18. The method of claim 1, wherein determining whether to store the object in either the non-heap a memory or that is logically separate from the heap memory is based on whether a size of the object exceeds a threshold.

19. The computer-readable storage medium of claim 7, wherein determining whether to store the object in either the non-heap memory or the heap memory is based on whether a size of the object exceeds a threshold.

20. The system of claim 13, wherein determining whether to store the object in either the native memory or the heap memory is based on whether a size of the object exceeds a threshold.

\* \* \* \* \*

UNITED STATES PATENT AND TRADEMARK OFFICE
CERTIFICATE OF CORRECTION

PATENT NO. : 10,423,527 B2
APPLICATION NO. : 14/939001
DATED : September 24, 2019
INVENTOR(S) : Ognjen Dragoljevic et al.

Page 1 of 1

It is certified that error appears in the above-identified patent and that said Letters Patent is hereby corrected as shown below:

In the Claims

In Column 18, Line 59, Claim 17, after "non-heap" delete "a".

In Column 18, Line 63, Claim 18, after "non-heap" delete "a".

Signed and Sealed this
Twenty-sixth Day of November, 2019

Andrei Iancu
*Director of the United States Patent and Trademark Office*